W. G. FORDING.
METHOD OF AND APPARATUS FOR FORMING A TIRE BEAD.
APPLICATION FILED JUNE 19, 1916. RENEWED MAR. 20, 1922.
1,423,929. Patented July 25, 1922.
2 SHEETS—SHEET 1.
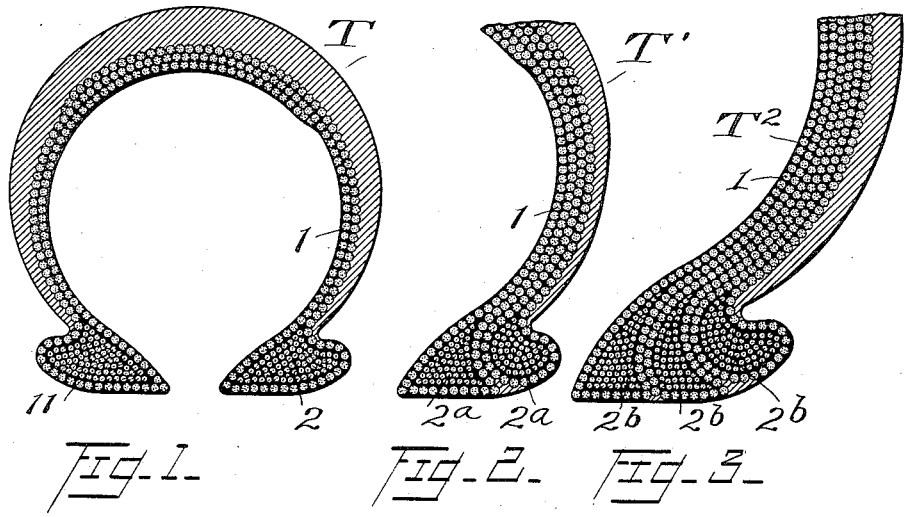
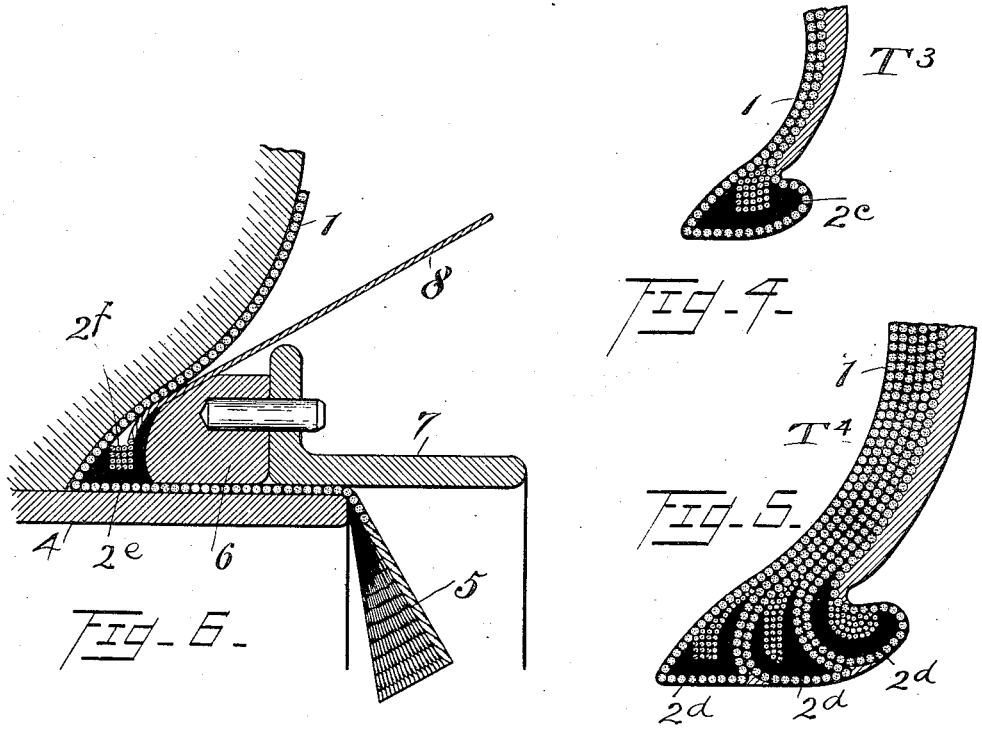
Inventor
William G. Fording
by Thurston & Knos
Attys

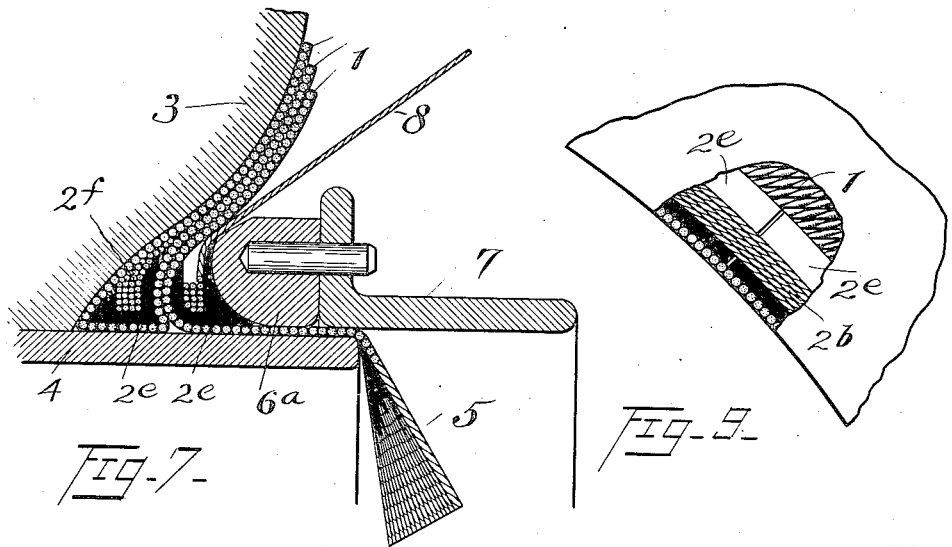
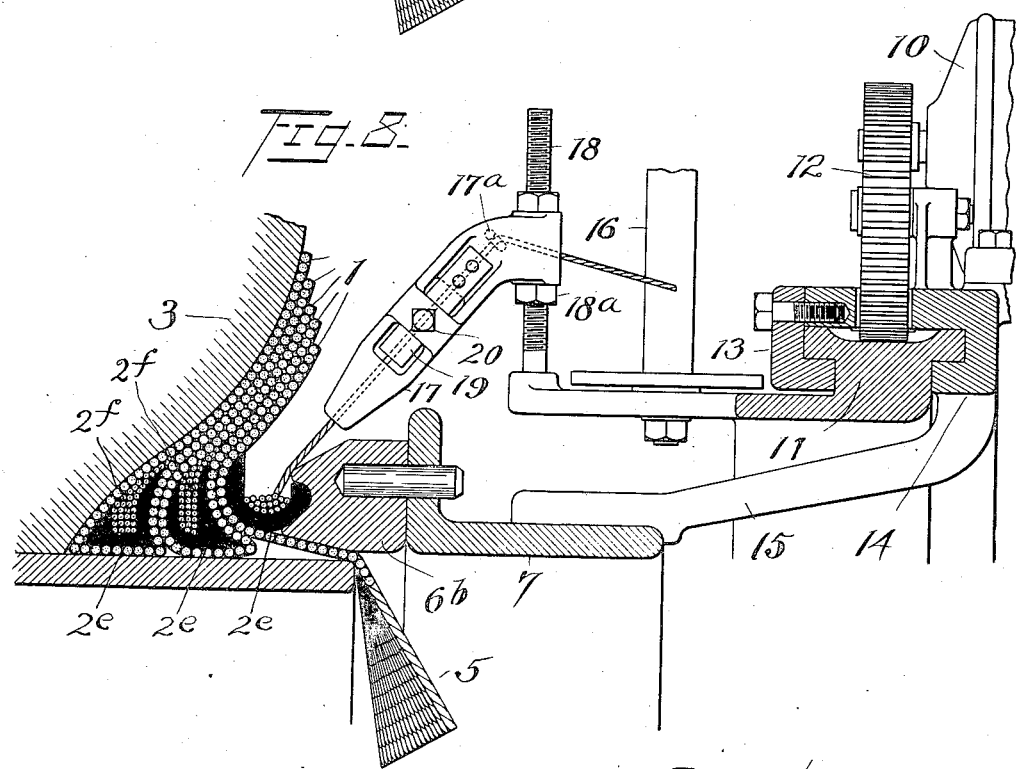

UNITED STATES PATENT OFFICE.

WILLIAM G. FORDING, OF CLEVELAND, OHIO, ASSIGNOR TO THE FISK RUBBER COMPANY, OF CHICOPEE FALLS, MASSACHUSETTS, A CORPORATION OF MASSACHUSETTS.

METHOD OF AND APPARATUS FOR FORMING A TIRE BEAD.

1,423,929.  Specification of Letters Patent.  Patented July 25, 1922.

Application filed June 19, 1916, Serial No. 104,391. Renewed March 20, 1922. Serial No. 545,345.

*To all whom it may concern:*

Be it known that I, WILLIAM G. FORDING, a citizen of the United States, residing at Cleveland, in the county of Cuyahoga and State of Ohio, have invented a certain new and useful Improvement in Methods of and Apparatus for Forming a Tire Bead, of which the following is a full, clear, and exact description.

This invention relates to a method of forming tire beads and of incorporating the same in a tire carcass. The invention has particular utility in connection with tires made by a process wherein an entire layer of tire forming material is formed on the core by passing the same from one side of the core to the other, and to a process wherein the successive layers of the fabric are formed by passing cords, or other tire forming material back and forth from one side of the core to the other so as to form the layers in unbroken succession, or with the same continuous material, such as disclosed in an application Serial No. 106,759 for forming tires filed by me June 30, 1916.

One of the important features of the present invention lies in the fact that the bead is simultaneously formed and incorporated in the tire carcass as the same is being built on tire forming core. Another feature comprises the method of forming or building up the bead, which in accordance with the present invention, is formed wholly or in part by winding a strand circumferentially in the bead portion of the tire carcass between portions thereof forming the successive layers.

The invention may be further briefly summarized as consisting in certain novel steps of the method which will be described in the specification and set forth in the appended claims.

In the accompanying sheets of drawings illustrating my improved method, and several tires or portions of tires in which beads, made in accordance with my invention, are incorporated, Fig. 1 is a cross-sectional view of a tire provided with two layers of fabric formed from cords, and provided with beads formed by my invention; Figs. 2 to 5 are cross-sectional views illustrating portions of tires illustrating different shapes of beads and different numbers of layers of fabric; Fig. 6 is a view illustrating part of the apparatus which is used in winding the strand of bead-forming material for forming the bead; Fig. 7 is a similar view illustrating how the bead at one side of the tire is formed in sections or units, which together constitute a composite bead for one side of the tire, two or more of said bead sections being utilized when the tire carcass has more than two layers of tire-forming material; Fig. 8 is a cross-sectional view of bead-forming apparatus which may be employed in carrying out my method, this view illustrating the forming of a third bead section or unit of a tire which has six or more layers of fabric; and Fig. 9 is a side view of a portion of tire with a part broken away to illustrate the construction and materials which enter into the formation of the bead when the latter is composed of a sectional ring of molded rubber or the like, together with a circumferentially wound strand which is wound in a groove or slot of the sectional ring.

The tire in which the bead, formed in accordance with my invention is incorporated, may be, and preferably is formed—that is to say, the tire carcass is formed—with two or more layers 1, of tire-forming material consisting preferably of a sheath of cords or equivalent tire-forming material which is laid back and forth from one side of the tire forming core to the other, together with beads or bead sections, one of which is provided at each side of the tire for each pair of layers of fabric, and which is incorporated in the tire as the successive layers are applied, or as the formation of the tire carcass proceeds. In Fig. 1 I have shown in cross-section, a tire T, whose carcass is composed of two layers 1, of cord fabric (with an additional thickness of the fabric at the tread) and beads 2, which are formed in the manner hereinafter described. In Fig. 2 I have shown a tire T', provided with four layers 1, of the cord fabric, having a bead composed of two sections or units $2^a$, each formed in the same manner, and with the same materials as illustrated in Fig. 1. In Fig. 3 I have shown a portion of a tire $T^2$, the carcass of which is formed from six layers 1, of cord, and having a bead composed of three units or sections $2^b$, each of which is formed from the same materials and in the same manner as are the bead or bead sections of Figs. 1 and 2, and each being formed or incorporated between the portions of the cords forming two adjacent layers. In Fig. 4 I have illustrated a tire T³, formed from two layers 1, of cord, and provided with a bead 2ᶜ, composed of a sectional ring of rubber or equivalent material, provided with a slot or groove filled with a circumferentially wound cord or strand; and in Fig. 5 I have shown a portion of a tire whose carcass is built up from six layers 1, of the cord fabric, and provided with a bead composed of three units or sections 2ᵈ, each including a sectional ring of rubber filled with a circumferentially wound strand or cord.

The tire carcass is formed on any suitable form of collapsible core 3, on the inner periphery of which is preferably provided a bead ring 4, which may be in two parts, and is removably attached to the core 3, as illustrated in Figs. 6, 7 and 8. As shown clearly in these figures, and as more fully described in my method application previously referred to, the fabric portion of the carcass is made from a sheath of cords, here illustrated at 5, which as previously stated, is laid back and forth from one side of the core to the other, a bead or bead unit being formed between successive layers, and the bead being applied at the completion of one layer and before the beginning of the next successive layer. As fully explained and illustrated in my companion application previously referred to, the sheath 5 extends circumferentially entirely around the core so that each time the sheath is passed from one side of the core to the other a complete layer, circumferentially considered, is formed. In forming the bead I employ at each side of the core 3, a bead forming ring which in Fig. 6 is designated 6, and which can be given any selected shape, depending upon the shape of the bead or of the bead section which is to be formed between said bead ring and the core, or layer or layers of fabric applied thereon. This bead-forming ring 6 is preferably attached to an annular ring carrier 7, which, together with the bead-forming ring 6, are adapted to slide inwardly over the bead ring 4, or over the sheath of cords which extend over the ring 4, and downwardly or inwardly as illustrated in Figs. 6 to 8.

As previously stated, the bead, whether it is in one, or a plurality of sections, is formed wholly or in part by winding in place a strand, cord or thread, which is designated 8 in Figs. 6 to 8. If the bead or bead section is formed wholly of this circumferentially wound strand, there will be a sufficient number of turns or windings of this strand to completely fill the space which has been provided for it by the shape of the bead-forming ring 6, which shape, as before stated, will depend upon the desired shape of the bead or bead section. In some instances, however, when it is desired that the bead have greater stiffness than that which would be afforded by the circumferentially wound strand alone, I prefer to incorporate in the bead a relatively stiff or hard material such as rubber, although other materials such as a ring or band of steel or wire may be employed. If a ring of hard rubber is utilized, as illustrated in several of the figures of the drawings, I prefer that this ring be formed in sections, a sufficient number of which will be provided to form a complete ring with the sections abutting as illustrated in Fig. 9. I prefer also, that this sectional ring of rubber be provided with a groove or slot into which the strand 8 may be wound to completely fill the space provided for it.

Figures 6 to 8 illustrate the fact that the bead or bead section may be given any desired shape, and that in forming the bead sections, different shapes of bead-forming rings may be employed. In Fig. 6, the bead-forming ring 6, is appropriately shaped to form the innermost section of the bead. In Fig. 7 the bead-forming ring here designated 6ᵃ is appropriately shaped to form the second bead section. In Fig. 8 the bead-forming ring here designated 6ᵇ is appropriately shaped to form the third bead section which will be the outermost bead section for a six-layer tire, such as illustrated in Fig. 3 or Fig. 5. These figures further illustrate the fact that this method of forming the bead has considerable flexibility in regard to the shape and design of the bead, any suitable shape being permissible to form the clincher or any other type of bead, and also as to the size and strength of the tire as determined by the number of layers of fabric.

While I do not desire to be confined to any particular apparatus, or particular manner of winding or placing in position the circumferential turns or passes of the bead-forming strand, in Fig. 8 I have illustrated a form of apparatus which may be used with high efficiency, it being understood that only so much of this apparatus is shown as will make clear the method which I prefer to carry out. This apparatus includes a motor 10, which may be, and preferably is an electric motor. This motor is connected to, and drives an annular gear or ring 11 with teeth formed on its periphery, through the medium of driving gearing 12. This ring 11, is designed to rotate in an annular guide-way formed by annular parts 13 and 14, this guide-way as well as the motor 10 and gearing 12 being supported from the annular carrier 7, by arms or brackets 15. Supported on, and movable with the rotating annular member 11 is a spool 16, which will carry a suitable amount of the strand 8, and adjacent the spool is a rotary winder or guide 17, which is adjustably supported on a threaded stud 18, and is provided with an opening or eye 17ᵃ through which the strand 8 is adapted to be fed. This winder or guide may be provided with a spring 19, the tension of which may be adjusted by a screw 20, to add tension to the strand as it is being wound. By adjusting nuts 18ᵃ formed on the screw 18, the position of the guide or winder can be varied to adapt the same for forming various sizes and diameters of beads.

When it is desired to form a bead section, or to fill the groove or slot in a sectional ring, the motor 10 is started. This rotates the ring 11 rapidly, revolving the spool carrying the strand or cord 8, and the winder. The latter is so positioned that the cord is laid or wound so as to form the bead section, and when a sufficient number of turns or windings have been laid, the motor will be stopped. Preferably the motor is stopped automatically when the right number of turns or windings have been laid in the bead, but the automatic means for accomplishing this is not shown, and it is believed to be unnecessary to show the same. In this manner a bead of just the right size and shape is formed very rapidly, and at the same time, very effectively.

It will be understood without further description, that when the bead or bead section is formed from the sectional ring of rubber and from the circumferentially wound strand, the ring of rubber will be placed in position, then the bead-forming ring and winding apparatus will be moved toward the core, with the bead-forming ring engaging the ring of rubber in the manner illustrated in the drawings, and then the cord or strand will be wound in place filling the slot or space in the rubber ring. The sectional rubber ring of each bead section of Figs. 6 to 9 is designated 2ᵉ, and the portion formed by the circumferentially wound strand is designated 2ᶠ.

While I have explained the preferred manner of carrying out my invention, the preferred materials employed, and one form of apparatus which may be utilized, I do not desire to be confined to the exact materials, to the precise steps of the method explained, or to the apparatus which has been illustrated, but aim in my claims to cover all modifications which do not involve a departure from the spirit and scope of my invention in its broadest aspects.

Having thus described my invention, what I claim is:

1. The method of forming a tire bead which comprises winding a plurality of turns or convolutions of bead-forming material in an annular space of a partially formed tire carcass while the latter is being built up on a tire-forming core.

2. The method of forming a tire bead which comprises forming and simultaneously positioning the bead by winding a strand of bead-forming material circumferentially of a tire-forming core in an annular space of a tire carcass while the latter is being formed on the core.

3. The method of forming a tire bead which comprises forming directly in the tire carcass a composite ring of rubber and a plurality of turns or winds of a continuous strand of bead-forming material the latter being wound in place in the carcass.

4. The method of forming a tire bead which comprises placing in the tire carcass a ring or annulus of bead forming material and winding circumferentially thereof additional bead forming material.

5. The method of forming a tire bead which comprises forming directly in the tire carcass being built, a bead ring by placing in the carcass an annular member having a slot and filling the slot by winding therein bead-forming material.

6. The method of forming a tire bead which comprises forming in the tire carcass, a bead ring by placing therein a sectional ring having an annular space or slot, and filling said space or slot by winding circumferentially of the ring a strand of bead-forming material.

7. The method of forming a bead in a tire carcass, the fabric of which is formed by passing tire-forming material back and forth from one side of a core to the other so as to form successive layers, which comprises winding bead-forming material circumferentially of the core between successive layers.

8. The method of forming a bead in a tire carcass, the fabric of which is formed by passing tire-forming material back and forth from one side of a core to the other so as to form successive layers of continuous material, which comprises forming between the successive layers a composite bead of circumferentially wound bead-forming material and relatively rigid or stiff material.

9. The method of forming a bead in a tire carcass, the fabric of which is formed by passing continuous tire-forming material back and forth from one side of a core to the other so as to form successive layers, which comprises forming between adjacent layers a bead ring composed of rubber and a circumferentially wound strand of bead-forming material.

10. The method of forming a bead in a tire carcass, the fabric of which is formed by passing continuous tire-forming material back and forth from one side of a core to the other so as to form successive layers, which comprises forming between successive layers a bead ring composed of rubber and a strand of bead-forming material wound circumferentially thereof.

11. The method of forming a bead in a tire carcass, the fabric of which is formed by passing continuous tire-forming material back and forth from one side of a core to the other so as to form successive layers, which comprises forming between certain of the layers, bead sections composed in part of circumferentially wound bead-forming material.

12. The method of forming a bead in a tire carcass, the fabric of which is formed by passing continuous tire-forming material back and forth from one side of a core to the other so as to form successive layers, which comprises forming between certain of the layers, bead sections composed of rings having slots and bead-forming material wound circumferentially in the slots.

13. In the building of a tire casing, laying upon a building support a circumferential sheath of tire building material, forming a tire bead and simultaneously locating it upon said material, and subsequently securing the bead by folding the material around it.

14. The method of building a tire casing comprising applying in place on the carcass material, previously unshaped bead-forming material, and shaping the bead-forming material as it is applied.

15. A tire building apparatus comprising a supprt upon which a tire carcass may be built up and adapted to hold the carcass material in extended position adjacent one edge of the carcass, and means for winding bead material circumferentially around the extended portion of the carcass material.

16. A tire building apparatus comprising a circular tire building support, and a shuttle rotatable coaxially with the support and adapted to carry bead-forming material.

17. A tire building apparatus comprising a circular tire building support, a shuttle rotatable coaxially with the support and adapted to carry bead-forming material, and means for rotating the shuttle.

18. A tire building apparatus comprising a circular tire building support, a shuttle rotatable coaxially with the support and adapted to carry bead-forming material, and tensioning means for said material.

19. A tire building apparatus comprising a tire building support, means to wind bead-forming material adjacent the bead portions of the support, and means for shaping said material into bead form.

20. A tire building apparatus comprising a tire building support, means to wind bead-forming material adjacent the bead portions of the support, and means for shaping said material into bead form and pressing it into bead position.

21. A tire building apparatus comprising a tire building support, means to wind bead-forming material adjacent the bead portions of the support, and means actuable simultaneously throughout the bead circumference to press towards the support the material so wound.

In testimony whereof, I hereunto affix my signature.

WILLIAM G. FORDING.